(12) United States Patent
Garjian

(10) Patent No.: US 10,465,120 B1
(45) Date of Patent: Nov. 5, 2019

(54) METHOD AND DEVICE WITH CATALYST STORAGE AND DELIVERY CAPSULE FOR CONVERTING BIOMASS INTO SOLID AND GASEOUS COMPONENTS

(71) Applicant: Michael Garjian, Easthampton, MA (US)

(72) Inventor: Michael Garjian, Easthampton, MA (US)

( * ) Notice: Subject to any disclaimer, the term of this patent is extended or adjusted under 35 U.S.C. 154(b) by 347 days.

(21) Appl. No.: 15/190,492

(22) Filed: Sep. 12, 2016

(51) Int. Cl.
| | |
|---|---|
| *C10B 47/44* | (2006.01) |
| *B01J 7/00* | (2006.01) |
| *B01J 19/00* | (2006.01) |
| *B01J 19/20* | (2006.01) |
| *B01J 35/00* | (2006.01) |
| *C10B 7/10* | (2006.01) |
| *C10B 31/04* | (2006.01) |
| *C10B 57/12* | (2006.01) |

(52) U.S. Cl.
CPC ............... *C10B 47/44* (2013.01); *B01J 7/00* (2013.01); *B01J 19/0013* (2013.01); *B01J 19/20* (2013.01); *B01J 35/0006* (2013.01); *C10B 7/10* (2013.01); *C10B 31/04* (2013.01); *C10B 57/12* (2013.01); *B01J 2219/00051* (2013.01)

(58) Field of Classification Search
CPC ...... B01J 3/03; B01J 35/0046; B01J 19/0013; C10B 53/02; C10G 49/02; C10G 23/1011
USPC ............... 585/240–242; 422/612; 202/118
See application file for complete search history.

(56) References Cited

U.S. PATENT DOCUMENTS

| | | | | |
|---|---|---|---|---|
| 4,705,603 A * | 11/1987 | McMullen | ............... | C10B 47/44 202/109 |
| 4,759,300 A * | 7/1988 | Hansen | ............... | C10B 53/00 110/224 |
| 4,908,104 A * | 3/1990 | Loomans | ............... | C10B 47/44 201/25 |
| 5,017,269 A * | 5/1991 | Loomans | ............... | C10B 7/10 201/25 |
| 7,893,307 B2 * | 2/2011 | Smith | ............... | C10B 7/10 201/2.5 |
| 8,388,813 B1 * | 3/2013 | Livingston | ............... | C10B 1/10 202/117 |
| 9,005,402 B2 * | 4/2015 | Del Monte | ............... | C10B 7/10 201/32 |
| 9,045,693 B2 * | 6/2015 | Wolfe | ............... | C10J 3/007 |
| 9,604,192 B2 * | 3/2017 | Tucker | ............... | C01B 32/16 |
| 9,605,211 B2 * | 3/2017 | Hayward | ............... | B09B 3/0083 |

(Continued)

*Primary Examiner* — Nina Bhat
(74) *Attorney, Agent, or Firm* — Keeley DeAngelo LLP; W Scott Keeley

(57) ABSTRACT

A hermetically sealed processing device with a catalyst storage and delivery capsule. The processing device is an elongate, tubular container that is hermetically sealed on each end by end plates. The processing device contains a screw conveyor with an arbor concentric about the long axis of the tubular container. The screw conveyor protrudes through each end plate and is mounted within a hermetic seal. The processing device further comprises a feed-stock-input port and a catalyst-input port on an input end of the processing device. Various heat zones as well as internal and surface temperature reading-probes reside along the length of the processing device. The output end of the processing device has a solid matter output port, a gas output port and a vacuum pump to evacuate gases through the gas output port.

9 Claims, 1 Drawing Sheet

(56) References Cited

U.S. PATENT DOCUMENTS

| | | | | |
|---|---|---|---|---|
| 2008/0286557 | A1* | 11/2008 | Tucker | C10B 47/30 428/318.4 |
| 2012/0111714 | A1* | 5/2012 | Court | C10B 7/10 201/2.5 |
| 2013/0256113 | A1* | 10/2013 | Tumiatti | C10B 1/10 201/19 |
| 2014/0008206 | A1* | 1/2014 | Miller | C10B 7/00 202/117 |
| 2016/0144351 | A1* | 5/2016 | Boldor | C10B 53/02 201/2.5 |

* cited by examiner

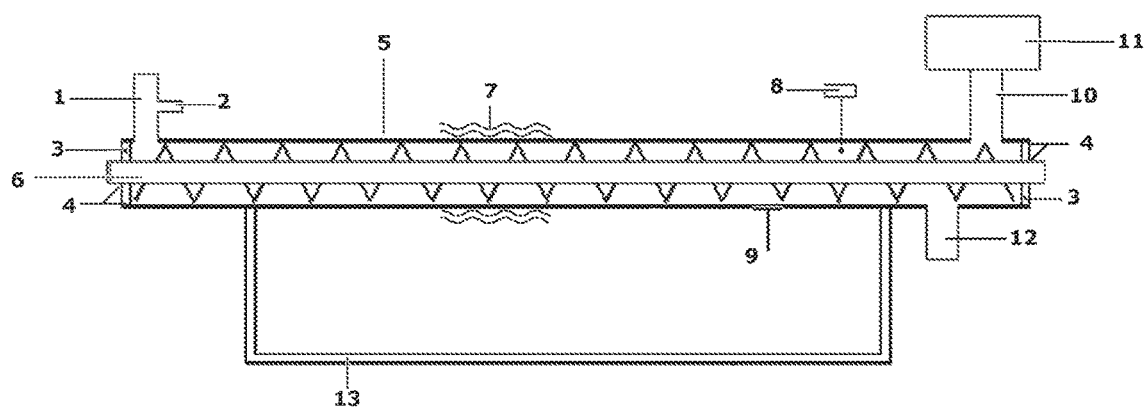

METHOD AND DEVICE WITH CATALYST STORAGE AND DELIVERY CAPSULE FOR CONVERTING BIOMASS INTO SOLID AND GASEOUS COMPONENTS

TECHNICAL FIELD

The invention relates to methods and devices for processing, storing and delivering biomass or other feedstocks.

BACKGROUND

Among the many efforts at recycling raw materials for fuel, pyrolysis of waste materials is currently used to produce hydrocarbon products. Pyrolysis is a thermochemical decomposition of organic material at elevated temperatures between 300° C. and 900° C., without the presence of oxygen or other reagents. Pyrolysis done by batch process is not as efficient as continuous-process pyrolysis.

SUMMARY

This method and apparatus processes biomass or other feedstocks in a sealed chamber under reduced atmospheric pressure through zones of varying elevated temperatures for a predetermined period while under the effect of a multipart catalyst.

The apparatus, also referred to as a processing device, provides a method to introduce the feedstock and catalyst into an evacuated processing device through a feedstock-input port and a catalyst-input port, then to convey the feedstock, via a screw conveyor with arbor or other means, through several heating zones of varying temperatures while evacuating any volatilized matter, gases, and residual un-volatilized solid matter from the processing device while maintaining the hermeticity of the processing device.

In this process, a catalyst must be prepared immediately before its delivery into a processing device. Because of this, and because the catalyst's components must be kept secret from the technicians involved in the process, the owners of the proprietary process must maintain inventories of all catalytic materials at each location where the process is done, and provide personnel at each location to mix and deliver the catalyst into the processing device.

This invention further provides a means to seal the saturated catalyst-activation component of the catalyst in a fragile and hermetic catalyst-activation component container into which has also been deposited an emitting substance which continuously provides a supply of saturating gas or liquid to maintain the saturation level of the catalyst-activating component. The sealed catalyst-activation component container is inserted into a catalyst-vehicle component container into which the second part of the catalyst has also been deposited. The catalyst-vehicle component container is constructed of a flexible, opaque material which will dissolve or evaporate in the heated environment of the processing device. The catalyst-vehicle component container is permanently sealed at each end once the catalyst-activation component container and catalyst-vehicle component have been inserted.

When the catalyst is introduced into the process device, the fragile catalyst-activation component container is broken by a physical force applied to the flexible catalyst-vehicle component container. The catalyst-vehicle component container is then shaken to mix the catalyst-activation component with the catalyst-vehicle component.

Once mixed, the catalyst-vehicle component container is introduced into the processing device through the input port simultaneously with the biomass or feedstock. This initiates a reaction which depolymerizes the feedstock as it is conveyed through increasingly hotter zones in the processing device. The volatilized gases or matter are then removed through the gas output port by a vacuum pump while the solid, un-volatilized matter is removed through the solid-matter output port.

A catalyst storage and delivery device employs a flexible catalyst-vehicle component container with each end permanently sealed. The device uses a hermetic, fragile or brittle catalyst-activation component container and an amount of catalyst-vehicle component. The catalyst-vehicle component container is made of a flexible, combustible or meltable material such as plastic, metal, foil or the like. The catalyst-activation component container may be made of glass, plastic, or other fragile material. It contains a catalyst-activation component and an emitting substance.

The catalyst-activation component is of a material that may be saturated by certain saturating gases or liquids. The emitting substance is of a material that absorbs or adsorbs the saturating gas or liquid and slowly releases it into the environment of the catalyst-activation component container to ensure that the saturation level of the catalyst-activation component remains stable to ensure a maximum shelf life.

To be effective, the catalyst-activation component must be saturated with a certain gas or liquid immediately before mixing with the catalyst-vehicle component. If the saturation level is lower than a certain minimum level, the mixed catalyst will not be effective. For this reason, it is necessary to saturate said catalyst-activation component at the moment of use. Because these materials are often proprietary, the saturating and mixing of the catalyst components must be performed by specially trained and authorized personnel. If the catalyst is being used at multiple locations, it is prohibitively expensive to broadly deploy the instant biomass-processing technology or any other technologies requiring such catalysts.

The catalyst storage and delivery capsule eliminates this limitation. Using the invention, it is possible to courier the catalyst-storage and delivery capsule to any point on the globe under secure conditions, similar to transport methods used for precious gems or restricted chemicals. When the catalyst-storage and delivery capsule arrives at its destination, it can be received by bonded, registered personnel and delivered to the point of use. The recipient need only break the fragile catalyst-activation component container within the catalyst-vehicle component container; vigorously shake the catalyst-vehicle component container to mix the contents; and then insert it into the processing device to initiate the reaction.

BRIEF DESCRIPTION OF THE DRAWING

FIG. 1 shows a cross-section diagram of the processing device.

DETAILED DESCRIPTION OF THE DRAWING

FIG. 1 shows a cross-section of a processing device 5, which in this embodiment is a tubular chamber. Enclosed in the processing device 5 is a screw conveyor with arbor 6 whose outside diameter is less than the inside diameter of the processing device 5. The arbor of the screw conveyor with arbor 6 extends beyond the ends of the processing device 5. Hermetically attached to each end of the processing device 5 are end plates 3 with a hermetic seal 4 through which the arbor of the screw conveyor passes. Thus the processing device 5, the screw conveyor with arbor 6, the end plates 3 and the hermetic seal 4 comprise a system which is hermetic and capable of maintaining a lower-than-atmospheric pressure. Located on the top of the input end of the processing device 5 is the feedstock input device 1 and a catalyst input port 2. The feedstock input port may be a rotary hermetic valve, a dual-valve airlock, or other mechanism which allows feedstock to be introduced into the processing device 5 without compromising its hermeticity. Attached along the length of the processing device 5 are a plurality of internal temperature-reading probes 8 and surface-temperature probes 9. (Only one of each is pictured.) A plurality of heating zones 7 using band heaters, induction-coil heaters, or other heating means, are attached along the length of the processing device 5. Attached at the bottom of the output end of the processing device 5 is a solid-matter output port 12 comprised of a device that enables solid matter to be removed from the processing device 5 without compromising hermeticity. The solid matter output port 12 may be a rotary 10 hermetic valve, a dual-valve airlock or other mechanism. At the top of the processing device 5 a gas output port 10 enables volatilized gases or matter to be drawn out of the processing device 5 by the vacuum pump 11. The entire processing device 5 with all attachments may be mounted on a portable mounting system 13 allowing it to be moved from location to location. The length of the processing device 5 will be determined by the application for which the system is used. It may be as short as five feet or more than 100 feet in length.

In the example embodiment of FIG. 1, before the introduction of the feedstock and catalyst, the processing device is heated to a predetermined temperature for each heat zone by electric band heaters or other heating means. When the processing device is heated, a vacuum pump 11 is turned on to bring the hermetic processing device 5 to a lower-than-atmospheric pressure. When both heating and evacuating processes are completed, a feedstock is introduced into the processing device 5 through the feedstock input device 1 and the catalyst input port 2 while maintaining the hermiticity and vacuum level of the processing device 5.

The feedstock is conveyed along the length of the processing device 5 by rotating the screw conveyor with arbor 6 at a predetermined RPM. As the feedstock travels through the various heating zones, it is acted upon by the catalytic reaction and depolymerized, resulting in the outgassing of various materials at each heat zone 7. The nature of the outgassed products depends on the nature of the feedstock. Due to the catalytic reaction within the processing device 5, the molecules and ions are reorganized into hydrocarbon chains of varying lengths, producing gaseous substances including methane, ethane, propane, ethylene, propylene, iso-butane, iso-pentane, octane, volatilized light bio-oils, volatilized heavy bio-oils, and other substances. The gaseous substances are drawn out of the processing device 5 by the vacuum pump 11 through the gas output port 10. These gases are further processed by cooling, condensing or other means. This results in the production of unique bio-oils and bio-gases of higher quality than traditional syngas and bio-oils produced by other gasification processes.

Upon reaching the output end of the processing device 5, most volatile substances have been removed from the feedstock and the remaining solid materials of carbon and minerals are removed through the solid-matter output port 12.

The invention claimed is:

1. An apparatus for separating feedstock into gaseous and solid fractions comprising:
    a provided catalyst storage and delivery capsule; and
    provided feedstock; and
    a single elongate tubular container having an input end and an output end; and
    a hermetic seal at each end of said elongate tubular container; and
    a vacuum pump for reducing the atmospheric pressure inside said elongate tubular container to below that of the ambient atmospheric pressure; and
    a screw conveyor rotationally engaged with said elongate tubular container for moving feedstock along the interior of said tubular container; and
    a feedstock-input port engaged with an input airlock that is in turn engaged with said elongate tubular container; and
    a catalyst-input port engaged with said airlock; and
    at least one heating element engaged with said elongate tubular container for conducting heat through the walls and into the interior space of said tubular container; and
    at least one sealable port for the insertion of at least one internal temperature sensor; and
    at least one external temperature sensor; and
    a solid-matter output port engaged with an output airlock that is in turn engaged with said elongate tubular container; and
    a gas-output port engaged with said output airlock that is in turn engaged with said elongate tubular container; wherein
    the atmospheric pressure inside the tubular container is drawn down by the vacuum pump to a negative pressure; and
    said negative pressure is maintained by intermittent engagement of said input and output airlocks; and
    said vacuum pump, said feedstock and the catalyst are fed into said input end of the elongate tubular container through their respective ports and through said input airlock wherein said feedstock is moved through the elongate tubular container by said screw conveyor, past said at least one heating element that is controlled by said internal and external temperature sensors, thereby separating said feedstock into gas and solid matter, wherein
    the solid matter is removed from the output end of the elongate tubular container through said output airlock and through said solid-matter output port, and gas is removed from the output end of the elongate tubular container through said output airlock and through said gas output.

2. The processing device of claim 1 wherein said processing device is a metal tube with two endplates, each containing a circumferential hermetic seal and a centrally located aperture with hermetic seal.

3. The apparatus of claim 1 wherein said input airlock and said output airlock are dual-valve airlocks.

4. The apparatus of claim 1 wherein, said input airlock and said output airlock are rotary hermetic valves.

5. The screw conveyor of claim 1 wherein an arbor is engaged along the center of said screw conveyor and passes through at least one of said hermetic seals wherein rotation of said arbor applies a rotary force to said screw conveyor and so causing material in the apparatus to move from said input end of the elongate tubular container to said output end.

6. The apparatus of claim 1 wherein said at least one heating element engaged with said elongate tubular container is configured to heat said elongate tubular container at a plurality of heat zones, each with differing temperatures, between the input end and output end of said apparatus.

7. The apparatus of claim 1 further comprising hermetic entry ports into which is inserted a temperature-measuring probe and reporting device, wherein
the temperature of the internal materials proximal to each heating element may be determined.

8. The apparatus of claim 1 wherein said elongate tubular container further comprises at least two sealable ports for insertion of at least two temperature sensors; wherein
the temperature may be measured proximal to each heating element.

9. The apparatus of claim 1 wherein said gas output port is connected to a vacuum pump enabling the removal of any gases from said apparatus without compromising the vacuum level within said elongate tubular container.

* * * * *